United States Patent
Al Sawan (10) Patent No.: US 7,083,228 B1
(45) Date of Patent: Aug. 1, 2006

(54) INFANT SEAT COVER

(76) Inventor: Alya Al Sawan, 685, Gougeon, Laval, Quebec (CA) H7X 4C5

( * ) Notice: Subject to any disclaimer, the term of this patent is extended or adjusted under 35 U.S.C. 154(b) by 0 days.

(21) Appl. No.: 11/165,061

(22) Filed: Jun. 24, 2005

(51) Int. Cl.
*A47D 15/00* (2006.01)

(52) U.S. Cl. .................................................. 297/184.13
(58) Field of Classification Search ............ 297/184.1, 297/184.11, 184.12, 184.13, 184.14, 184.15, 297/219.12
See application file for complete search history.

(56) References Cited

U.S. PATENT DOCUMENTS

| | | | | |
|---|---|---|---|---|
| 4,583,779 A | * | 4/1986 | Myers | 297/224 |
| 5,074,616 A | * | 12/1991 | Smith | 297/184.13 |
| 5,522,639 A | * | 6/1996 | Jaime | 297/184.13 |
| 5,730,490 A | * | 3/1998 | Mortenson | 297/184.11 |
| 6,039,393 A | * | 3/2000 | Roh | 297/184.13 |
| 6,481,791 B1 | * | 11/2002 | Facchini et al. | 297/184.14 |
| 6,517,153 B1 | * | 2/2003 | Brewer | 297/184.15 |
| 6,546,574 B1 | * | 4/2003 | Bader | 5/94 |
| 6,547,325 B1 | * | 4/2003 | Drost et al. | 297/184.13 |

* cited by examiner

Primary Examiner—Peter R. Brown

(57) ABSTRACT

An infant car seat cover for mounting over an infant car seat includes a strip of cover material defining a cover base peripheral edge, the cover base peripheral edge being configured and sized so as to be wrappable about the seat peripheral edge. The cover base peripheral edge is releasably attachable to the seat; The strip of cover material has a substantially tent-like configuration such that with the cover base peripheral edge wrapped around the seat peripheral edge, the strip of cover material is configured and sized so as to fit over the infant car seat with its arm in its extended configuration. The strip of cover material defines a cover front section and a generally opposed cover rear section for substantially covering respectively the seat front and back sections. The cover front and rear sections are releasably attached together about adjacent peripheral edges thereof.

17 Claims, 6 Drawing Sheets

INFANT SEAT COVER

FIELD OF THE INVENTION

The present invention relates to the general field of infant seat accessories and is particularly concerned with an infant car seat cover.

BACKGROUND OF THE INVENTION

Because of the relatively large number of automobile accidents in which infants are seriously wounded or killed, many seat experts recommend that infants travelling in automobiles be placed in specially designed infant car seats. In North America and other jurisdictions, it is mandated that an infant being transported in an automobile be carried in such an infant car seat. The infant car seat must itself be securely fastened in place using suitable means such as the automobile seat belts.

Such infant car seats are designed to protect the infant by reducing the possibility of injuries in the event of an accident or other cause of rapid deceleration. In the event of a rapid deceleration, the movement of the infant is severely restricted, such that the possibility of the infant flying through the windshield or smashing against the dashboard is greatly reduced.

Conventional infant car seats are produced and sold by a number of different manufacturers and come in a variety of different sizes and shapes. Infant car seats generally have substantially the shape of an oblong basket into which the infant is placed while reclining on its back and into which the infant is then secured using straps over the shoulders and through the legs in what is effectively a three-point restraining harness.

Typically, the conventional infant car seat includes a lower seat portion serving to support the legs and lower torso of the infant. A back extends substantially upwardly beyond the head of the infant, serving to support its head and upper torso. Opposing sides are formed along the edges of the lower seat portion and back, completing the shell-like shape of the seat.

A substantially U-shaped arm forming a handle is pivotally attached to the sides of the shell and is adapted to be selectively locked in selected positions by a locking means. Typically, the handle can be pivoted between upper and lower extremes for use respectively as a carrying handle or as a brace for keeping the seat in an upright condition when it is rested upon a generally horizontal supporting surface. Oftentimes, it may prove desirable to remove the infant car seat from the vehicle and carry it by the handle or place it on a wheeled stroller frame.

Although most conventional car seats typically satisfactorily serve their intended purpose of protecting a child against the potential repercussions of rapid acceleration and deceleration when travelling in a vehicle, they typically nevertheless suffer from at least one major drawback. Indeed, although some conventional infant car seats are provided with some type of sun shade, conventional car seats offer little or no protection against environmental elements such as cold air, wind, rain, snow and the like. Accordingly, there exists a need for an infant car seat cover.

A conventional blanket, towel or the like is sometimes positioned over the upright handle and open area of the infant car seat in order to provide a makeshift tent-like weather shield. This prior art method of using conventional blankets, towels or the like however suffers from numerous drawbacks.

For example, the blanket being unattached to the infant car seat may easily fall off the latter when subjected to gusts of wind or may simply slide off the infant car seat during manipulation of the latter. In other instances, the blanket may be inadvertently biased towards the infant in the car seat causing a potential choking hazard.

Furthermore, conventional blankets being deprived of venting means may lead to overheating of the infant and/or to excessive breathing by the infant of carbon dioxide with potential health consequences. Still furthermore, the conventional blanket being typically positioned over the carrying handle may hinder the use of the latter potentially leading to the infant car seat being inadvertently dropped and injuries to the infant.

The prior art has shown some examples of patents disclosing items adapted to be used as infant seat covers. For example, U.S. Pat. No. 4,946,221 issued Aug. 7, 1990 to Isabel C. Livingston; U.S. Pat. No. 5,074,616 issued Dec. 24, 1991 to Gerry N. Smith; U.S. Pat. No. 4,997,231 issued Mar. 5, 1991 to Roberta W. Smith; U.S. Pat. No. 5,522,639 issued Jun. 4, 1996 to Orlando C. Jaime; U.S. Pat. No. 5,730,490 issued Mar. 24, 1998 to Kristin M. Mortenson; U.S. Pat. No. 6,019,421 issued Feb. 1, 2000 and U.S. Pat. No. 6,039,393 issued Mar. 21, 2000 to Warren E. Roh; U.S. Pat. No. 6,056,355 issued May 2, 2000 to Elisabeth A. Klassen; U.S. Pat. No. 6,481,791 issued Nov. 19, 2002 to Mylene Sacchine; U.S. Pat. No. 6,517,153 issued Feb. 11, 2003 to Marvalee Brewer; Canadian Patent No. 2,397,441 issued Mar. 19, 2003 to Michelle Haney; U.S. Pat. No. 6,546,574 issued Apr. 15, 2003 to Robert F. Bader; and U.S. Pat. No. 6,547,225 issued Apr. 15, 2003 to Mercedes Drost constitute examples of prior art patents disclosing structures adapted to use as infant seat covers.

Although somewhat useful, the structures disclosed in the above-mentioned patents still nevertheless suffer from numerous drawbacks. For example, some of the above-mentioned patents disclose structures which are not specifically tailored for protecting the infant from winter-like conditions but rather mainly from sun, dust and insects. Other structures may potentially limit the natural movement of the infant.

Yet, still, other structures offer only limited visual access to the infant in the car seat and limited visual access for the infant to the external environment. Furthermore, some prior art covers simply do not allow proper access to the car seat handle when positioned thereover.

Still, furthermore, some prior art covers are not adapted to be easily and readily mounted over conventional car seats and/or are not designed so as to be fittable over the variety of car seat designs. Yet, still furthermore, some prior art covers do not allow for proper ventilation of the volume located thereunderneath. Also, some prior art covers do not allow the cover to be left in place on the infant car seat even though the infant is to be placed into or removed from the infant car seat.

Accordingly, there exists a need for an improved infant car seat cover. It is a general object of the present invention to provide such an improved infant car seat cover.

SUMMARY OF THE INVENTION

In accordance with the present invention, there is provided an infant car seat cover for mounting over an infant car seat, the infant car seat including a seat front section for supporting the legs of an infant and a seat back section for supporting the head and torso of the infant, the infant car seat also including opposite seat side sections extending from the edges of the seat front and back sections; the seat front, back and side sections together defining a seat peripheral edge; the infant car seat also including a substantially U-shaped seat handle pivotally attached to the seat side sections for pivotal movement between an extended configuration a retracted configuration for respectively facilitating handling of the infant car seat and facilitating insertion and withdrawal of the infant into and out of the infant car seat; the infant car seat cover comprising: a strip of cover material, the strip of cover material defining a cover base peripheral edge, the cover base peripheral edge being configured and sized so as to be wrappable about the seat peripheral edge; the cover base peripheral edge being provided with a cover releasable attachment means for releasably attaching the strip of cover material to the seat; the strip of cover material having a substantially tent-like configuration such that with the cover base peripheral edge wrapped around the seat peripheral edge, the strip of cover material is configured and sized so as to fit over the infant car seat with its arm in its extended configuration; the strip of cover material defining a cover front section and a generally opposed cover rear section for substantially covering respectively the seat front and back sections; the cover front and rear sections being releasably attached together about adjacent peripheral edges thereof by a suitable section releasable attachment means.

Typically, when in a closed configuration, the strip of cover material defines a pair of substantially opposed and generally triangular side surfaces joined about corresponding edges by a pair of a substantially rectangular-shaped and angled top surfaces; the top surfaces merging about the apex of the strip of cover material.

Conveniently, the cover front and rear sections are configured and sized such that when detached from each other about the section releasable fastening means, the strip of cover material may be positioned in a so called blanket configuration wherein the cover rear section is attached to the seat arm in its extended configuration so as to form a hood for the head of an infant while the cover front section is laid down over the body of the infant so as to act as a blanket for the latter.

Typically, the cover releasable attachment means includes a strip of resiliently deformable material protectively housed within a corresponding strip hem. Conveniently, the section releasable attachment means includes a zip-type fastener.

Typically, the strip of cover material is further provided with at least one cover handle aperture extending therethrough; the cover handle aperture being configured, positioned and sized so as to allow an intended user to grasp the seat handle when the strip of cover material is mounted over the latter in its extended configuration.

Conveniently, the strip of cover material is provided with a cover handle aperture extending through both the cover front and rear sections substantially adjacent their respective peripheral edges; the cover handle apertures being both configured, positioned and sized so as to allow an intended user to grasp the seat handle when the strip of cover material is mounted over the latter in its extended configuration. Typically a handle aperture covering means is also provided for selectively covering the cover handle aperture.

Conveniently, the strip of cover material is further provided with a cover main aperture extending therethrough for allowing visual access to the child.

In one embodiment of the invention, the cover main aperture is provided with a strip of substantially transparent or translucent material extending thereacross. In another embodiment of the invention, the cover main aperture is provided with a meshed screen extending thereacross.

Conveniently, the infant car seat further comprises a cover-to-handle releasable attachment means for releasably securing the strip of cover material to the seat handle. Typically, the cover-to-handle releasable attachment means includes at least one attachment strap secured to the inner surface of the strip of cover material.

Advantages of the present invention include that the proposed infant car seat cover provides a weather shield against a variety of environmental elements such as relatively cold temperatures, wind, rain, snow and the like. In an alternative embodiment of the invention, the proposed car seat cover may be made out of a relatively lighter material and used as a shield from dust, insects and the glare of the sun. The proposed cover allows an infant positioned within a conventional infant car seat to remain relatively cosy and comfortable even in relatively harsh weather conditions.

Also, the proposed cover is designed so as to be easily and readily mounted in an operational configuration over a wide variety of conventional infant car seats of various shapes and sizes through a set of quick and ergonomic steps without requiring manual dexterity.

Still furthermore, the proposed cover is designed so as to be retro-fittable on conventional infant car seats without requiring modifications or alterations thereto and without the risks of damaging the latter.

Yet still furthermore, the proposed infant car seat cover is designed so as to be securely attached to the infant car seat so as to reduce the risks of having the cover blown away or otherwise unintentionally removed from the car seat regardless of the operational configuration of the cover relative to the infant car seat.

Also, the proposed cover allows the infant positioned in a car seat thereunderneath free movement of its various body parts without interference therewith so as to allow the infant to remain occupied and so as to reduce the risks of the infant becoming claustrophobic.

Also, the proposed cover allows the infant to be provided with comforting objects such as a conventional teddy bear or the like even when the cover is operationally mounted over the car seat.

The proposed cover is further designed so as to allow a portion thereof to open up and serve as a covering blanket to the infant. When in the blanket forming configuration the proposed cover allows at least the face of the infant to be left exposed for ease of breathing.

Yet, still furthermore, the proposed cover is provided with venting means for allowing proper breathing of the infant even in situations wherein the cover fully covers the infant car seat.

Yet, still furthermore, the proposed cover is provided with means for facilitating grabbing and handling of the infant car seat handle either from the front or the back so as to reduce the risks of dropping the infant car seat and so as to facilitate transportation thereof.

Yet, still furthermore, the proposed infant car seat allows an infant to be placed into or removed from the infant car seat without the necessity of first having to remove the proposed cover away from the infant car seat.

Also, the proposed car seat allows the caregiver to have visual access to the infant being carried and, for the infant, visual access to the external environment.

Yet, still furthermore, the proposed car seat cover is designed so as to be aesthetically pleasing in order not to deter the overall aesthetic appearance of the infant car seat and even improve thereon.

Also, the proposed cover is designed so as not to interfere with the base of the car seat or stroller, the safety harness or the movement of the car seat handle.

Also, the proposed infant car seat cover is designed so as to be manufacturable using conventional materials and conventional forms of manufacturing so as to provide an infant car seat cover that will be economically feasible, long-lasting and relatively trouble-free in operation.

BRIEF DESCRIPTION OF THE DRAWINGS

Embodiments of the present invention will now be disclosed, by way of example, in reference to the following drawings in which.

DETAILED DESCRIPTION

Figure 1:
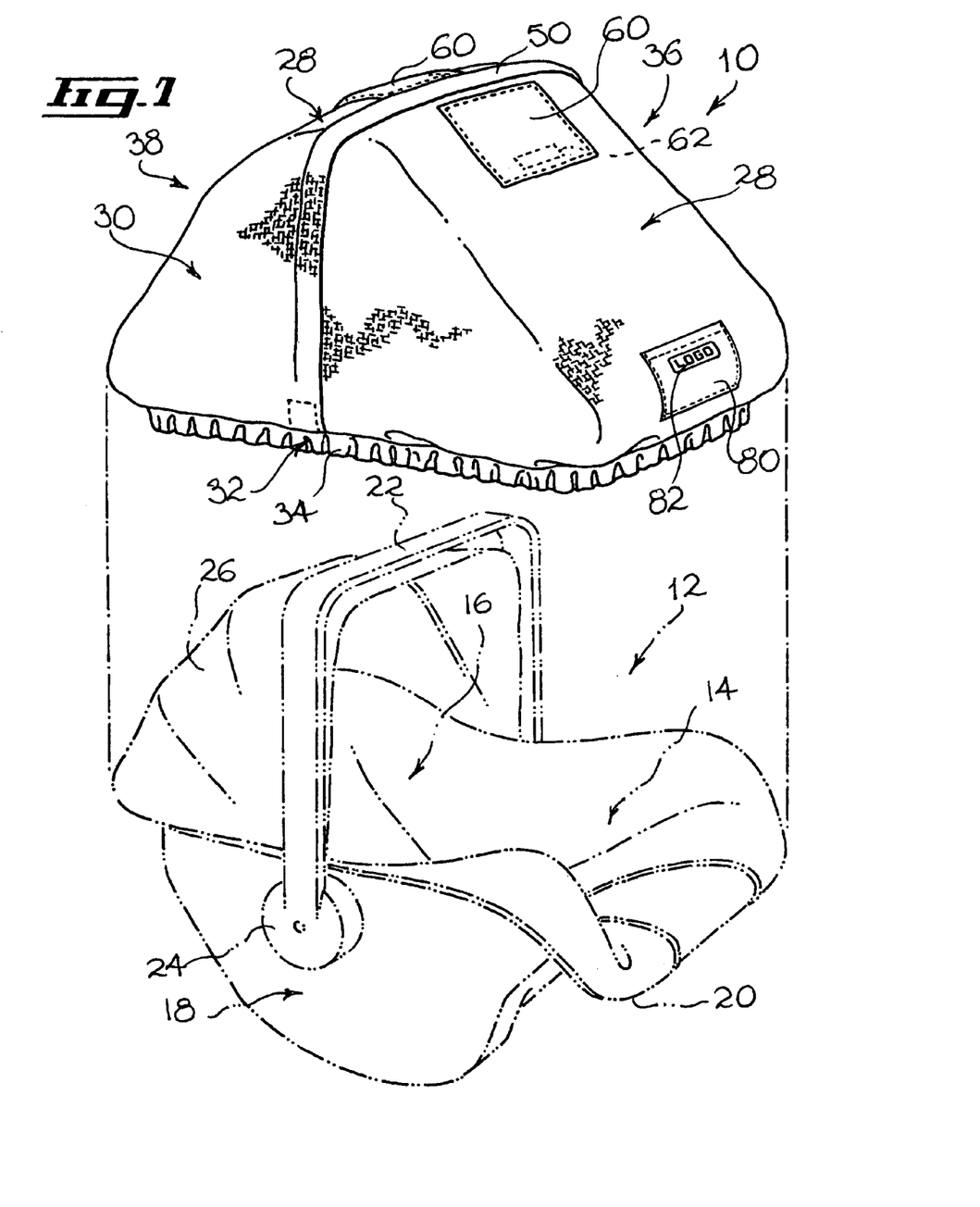
FIG. 1, in a perspective view, illustrates an infant car seat cover in accordance with an embodiment of the present invention, the cover being shown about to be mounted on a conventional infant car seat, the conventional infant car seat being shown in phantom lines.

Referring to FIG. 1, there is shown an infant car seat cover in accordance with an embodiment of the present invention, generally indicated by the reference numeral 10. The cover 10 is shown about to be mounted on a conventional infant car seat generally indicated by the reference numeral 12. It should be understood that although the cover 10 is shown about to be mounted on a specific type of infant car seat 12, the cover 10 could be used on other types of infant car seats having other features and/or another configuration and/or size without departing from the scope of the present invention. The cover 10 could further be used on other types of infant seats such as the seat of strollers or the like without departing from the scope of the present invention.

By way of example, the infant car seat 12 shown in the drawings has a substantially oblong or turtle shell-like configuration. The infant car seat 12 includes a foot, bottom or lower seat portion 14 for supporting the legs of the infant. The infant car seat 12 also defines a head, top or back portion 16 for supporting the head and torso of the infant. Opposing side sections 18 (only one of which is shown in FIG. 1) extend from the edges of the lower and back sections 14, 16. The lower, back and side sections 14, 16, and 18 together define a seat peripheral edge 20.

The inner surface of the infant car seat 12 hence defines a substantially concave configuration. This concave configuration is typically lined with a suitable soft fabric lining and also typically cushioned. The lining is provided with openings (not shown) through which the straps (also not shown) extending from the seat may be inserted such that the infant is securely retained by the seat.

A substantially U-shaped arm 22 forming a seat handle is typically attached to the side sections 18 by corresponding hinge mechanisms 24 (only one of which is shown in FIG. 1). As indicated by arrow A in FIG. 6, the arm 22 is typically pivotable between an extended configuration a retracted configuration for respectively facilitating handling of the infant car seat 12 and facilitating insertion and withdrawal of an infant into and out of the infant car seat 12.

Figure 6:
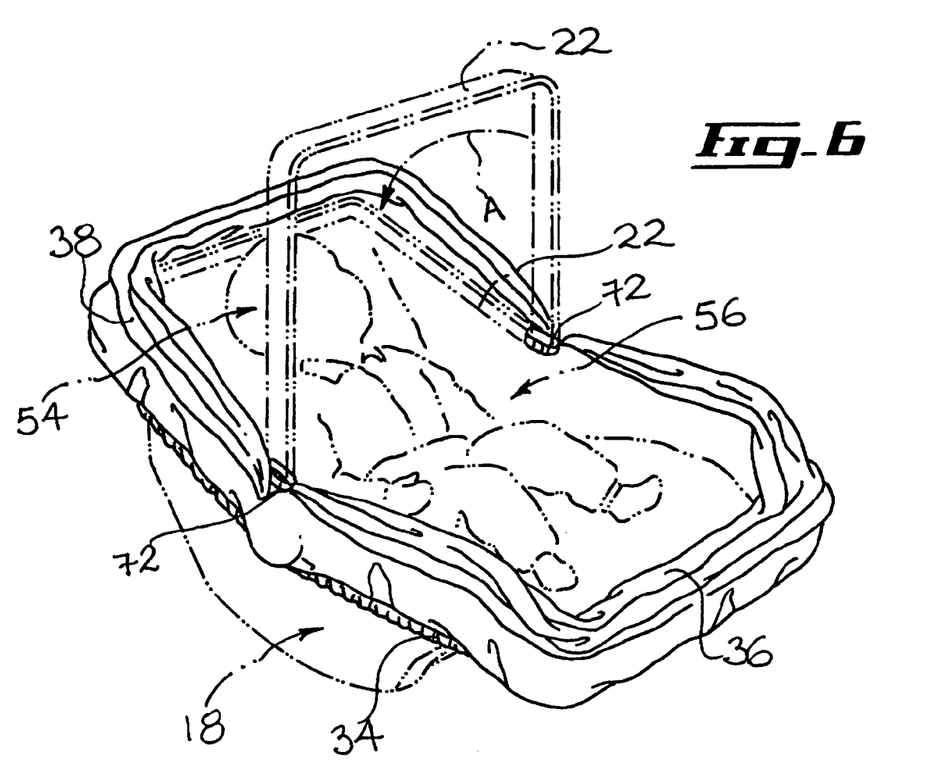
FIG. 6, in a perspective view, illustrates the infant car seat cover shown in FIGS. 1 through 5 mounted on a conventional infant car seat. The conventional infant car seat being shown in phantom lines, the cover being shown in a retracted configuration.

As shown more specifically in FIG. 1, the infant car seat 12 is typically further provided with a sun shade panel 26 attached at a first peripheral edge thereof to the arm 22 and at an opposed peripheral edge thereof to an adjacent section of the seat peripheral edge 20. The sun shade panel 26 is typically made out of a substantially flexible piece of material so as to be selectively positionable in an extended configuration shown in FIG. 1 for shading the head of an infant and in a retracted configuration such as shown in FIG. 6.

As shown more specifically in FIG. 1, the cover 10 includes a strip of cover material having a substantially tent-like configuration. When in a deployed or closed configuration, the strip of cover material typically defines a pair of substantially opposed and generally triangular side surfaces 30 (only one of which is shown in FIG. 1) joined about corresponding edges by a pair of a substantially rectangular-shaped and angled top surfaces 28. The top surfaces 28 typically merge about the apex of the cover 10. It should, however, be understood that the configuration of the cover 10 could vary depending on the configuration of the infant car seat 12 intended to be covered.

Regardless of its configuration, the cover 10 defines a cover base peripheral edge 32. The cover base peripheral edge 32 typically has a substantially rectangular configuration. The cover base peripheral edge 32 is configured and sized so as to be wrappable or positionable about the seat peripheral edge 20.

Figure 2:
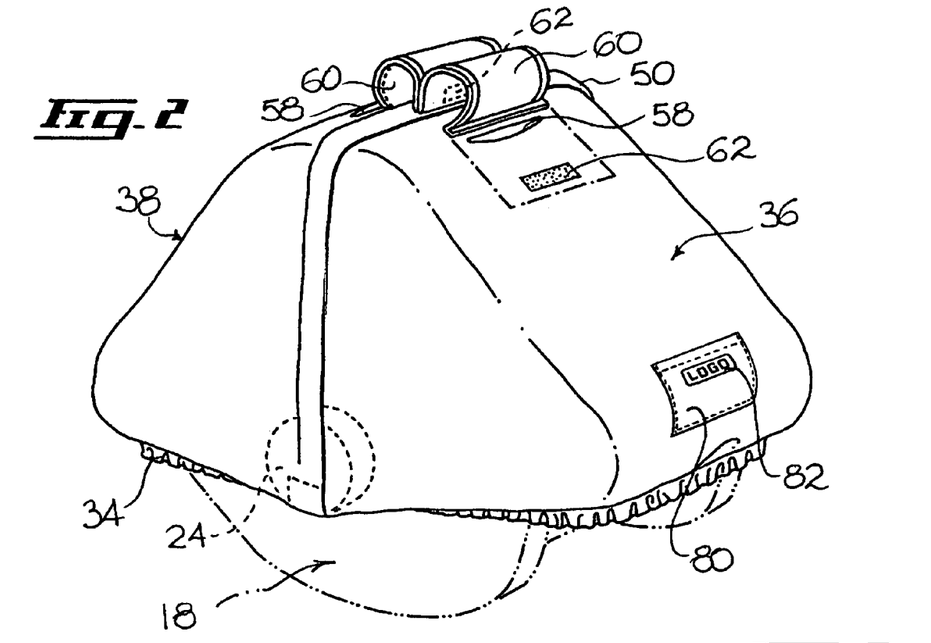
FIG. 2, in a perspective view, illustrates the infant car seat cover shown in FIG. 1 mounted on the infant car seat also shown in FIG. 1, the cover being shown with its auxiliary flaps in an opened configuration.

As shown more specifically in FIG. 2, with the cover base peripheral edge 32 mounted about the seat peripheral edge 20, the strip of cover material is configured and sized so as to fit over the infant car seat 12 with its arm 22 in its extended configuration. The strip of cover material is also configured and sized so as to provide sufficient room for an infant seated within the infant car seat 12 with the strip of cover material mounted thereover relatively interference-free movement.

The cover base peripheral edge 32 is provided with a cover releasable attachment means for releasably attaching the strip of cover material to the seat 12. The cover releasable attachment means may take any suitable form. In the embodiment shown throughout the Figures, the cover releasable attachment means includes a strip of resilient materials such as a strip of elastic material protectively housed within a corresponding strip hem 34. Preferably, the strip hem 34 is formed by being sewn on the inner surface of the strip of cover material.

It should be understood that other types of cover releasable attachment means could be used without departing from the scope of the present invention. For example, a drawstring or other suitable means for closing the perimeter of the strip of cover material around the peripheral edge 20 of the seat 12 could also be used. A strip of elastic material is preferred because it allows quick, easy and ergonomical installation to and removal from the infant car seat 12.

The strip of cover material typically defines a cover front section 36 and a generally symmetrically opposed cover rear section 38 for substantially covering respectively the front and rearward sections 14, 16 of the infant car seat 12. The cover front and rear sections 36, 38 are typically releasably attached together about adjacent peripheral edges thereof by a suitable section releasable attachment means.

Figure 4:
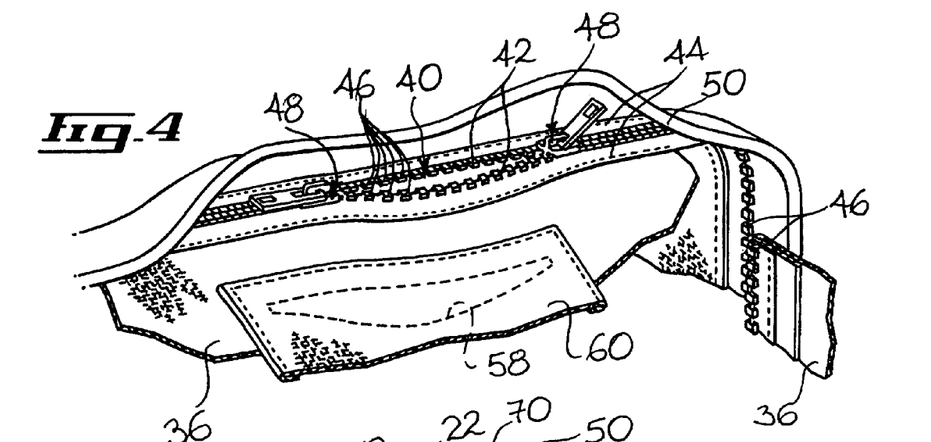
FIG. 4, in a partial perspective view with sections taken out, illustrates some of the features of the infant car seat cover shown in FIGS. 1 through 3.

As illustrated more specifically in FIG. 4, in the embodiment shown throughout the Figures, the section releasable attachment means includes a zip-type fastener 40. As is well known in the art, the zip-type fastener 40 includes fastener strips 42 sewn by fastener sewing lines 44 respectively to the cover front and rear sections 36, 38 adjacent their respective peripheral edges.

The fastener strips 42 are provided with conventional interlocking projections 46. At least one, and preferably two, proposed fastening slides or cursors 48 are provided for selectively allowing fastening or separation of the front and rear sections 36, 38.

A section flap 50 is typically provided for at least partially covering the section releasable fastening means when the latter is in its closed or fastened configuration. As shown more specifically in FIG. 3, the section flap 50 typically includes a flap portion 52 of the cover rear section 38 folded over and sewn to the flange of the corresponding fastener strip 42 using a sewing line 44. The section flap 50 is intended to protect the section releasable fastening means against environmental elements such as dust or the like and also improve the overall aesthetical appearance of the cover 10 by releasably hiding the section releasable fastening means.

Figure 5:
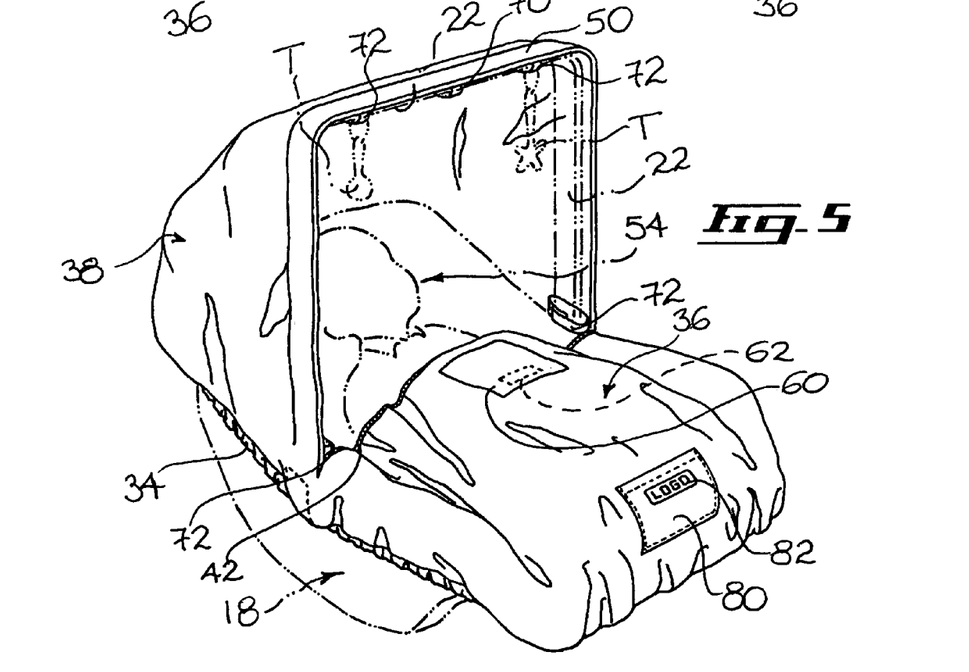
FIG. 5, in a perspective view, illustrates the infant car seat cover shown in FIGS. 1 through 4 mounted on a conventional infant car seat, the conventional infant car seat being shown in phantom lines, the cover being also shown with a section thereof being used as a blanket for a child, the child being shown in phantom lines.

As illustrated in FIG. 5, with the cover front and rear sections 36, 38 detached from each other about the section releasable fastening means, the cover 10 may be positioned in a so called blanket configuration. In the blanket configuration the cover rear section 38 remains attached to the arm 22 with the latter in its extended configuration so as to form a hood for the head 54 of an infant while the cover front section 36 is laid down over the body 56 of the infant so as to act as a cover or blanket for the latter.

This configuration may prove to be particularly useful in a variety of situations such as when the infant is brought from a relatively cold or harsh environment into a more comfortable environment and wherein it is desirable to leave the infant within the infant car seat 12 without the need for full coverage of the infant car seat cover 10. Alternatively, as shown in FIG. 6, with the cover front and rear sections 36, 38 releasably detached from each other, the cover rear section 38 may also be folded so as to facilitate insertion and withdrawal of the infant into and out of the infant car seat 12 without the need for removing the cover 10 therefrom.

Figure 3:
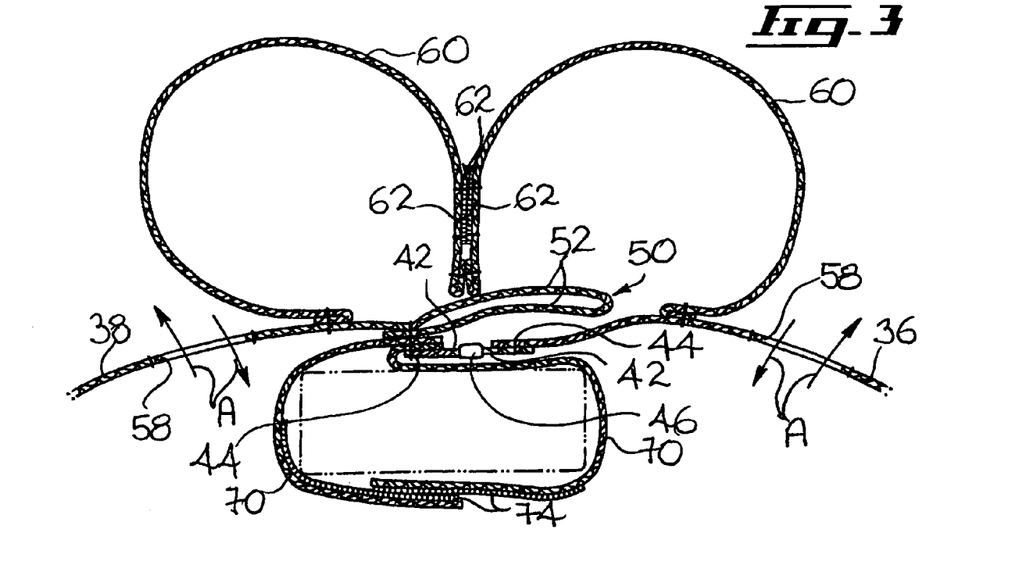
FIG. 3, in a partial transversal cross-sectional view with sections taken out, illustrates the auxiliary flaps and associated apertures of the infant car seat cover shown in FIG. 2.

As illustrated more specifically in FIGS. 2 and 3, the strip of cover material is typically further provided with at least one, and preferably a pair of cover handle apertures or slots 58 extending therethrough. Typically, the strip of cover material is provided with a cover handle aperture 58 extending through both the cover front and rear sections 36, 38 substantially adjacent their respective peripheral edges.

Typically, the cover handle apertures 58 are configured, positioned and sizes so as to allow an intended user to grasp the seat arm or handle 22 when the strip of cover material is mounted over the latter. The cover handle apertures 58 are also intended to allow selective flow of air therethrough such as schematised by arrows A in FIG. 3. The cover handle apertures 58 are hence adapted to allow for ventilation of the space occupied by the child when the cover 10 is put over the seat 12 in its fully covering configuration shown in FIG. 2. Optionally, the cover handle apertures 58 may also be used for visually accessing the child when the cover is in its fully covering configuration as shown in FIG. 2.

The cover 10 is still preferably further provided with a handle aperture covering means for selectively covering and/or closing the cover handle apertures 58. In the embodiment shown in FIGS. 1 through 6, the handle aperture covering means includes handle aperture flaps 60 configured, sized and positioned so as to be positionable over the cover handle apertures 58 such as shown in FIG. 1.

The handle aperture flaps 60 are provided with flap releasable attachment means. In a flap closed configuration shown in FIG. 1, the flap releasable attachment means allows the handle apertures flap 60 to be releasably attached to their corresponding front or rear cover sections 36, 38 in an overlying relationship relative to the cover apertures. In a flap opened configuration shown in FIGS. 2 and 3, the flap releasable attachment means allows the aperture flaps 60 to be releasably attached to each other in as spaced relationship relative to cover apertures 58.

The flap releasable attachment means may take any suitable form. In the embodiment shown throughout the Figures, the flap releasable attachment means includes complementary strips 62 or miniature hook and loop fibres such as commercially sold under the trade mark VELCRO.

It should be understood that whenever strips of miniature hook and loop fibres are mentioned in the description of the invention and/or illustrated in the drawings many other types of closure means could be used without departing from the scope of the present invention. By way of example snaps, hook and eye closures, button closures or the like could be used without departing from the scope of the present invention. Placement, configuration and number of such closures could also vary from the one depicted in the illustrations without departing from the scope of the present invention.

Figure 12:
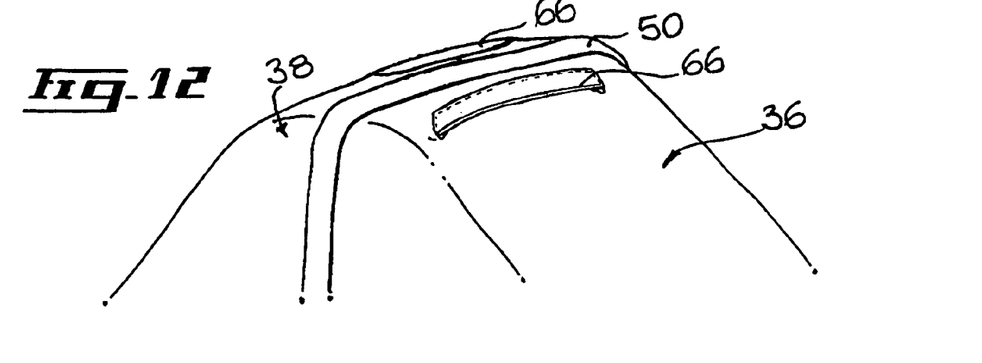
FIG. 12, in a partial perspective view with sections taken out, illustrates an auxiliary aperture, in accordance with an alternative embodiment of the present invention, the auxiliary aperture being shown in a closed configuration.
Figure 13:
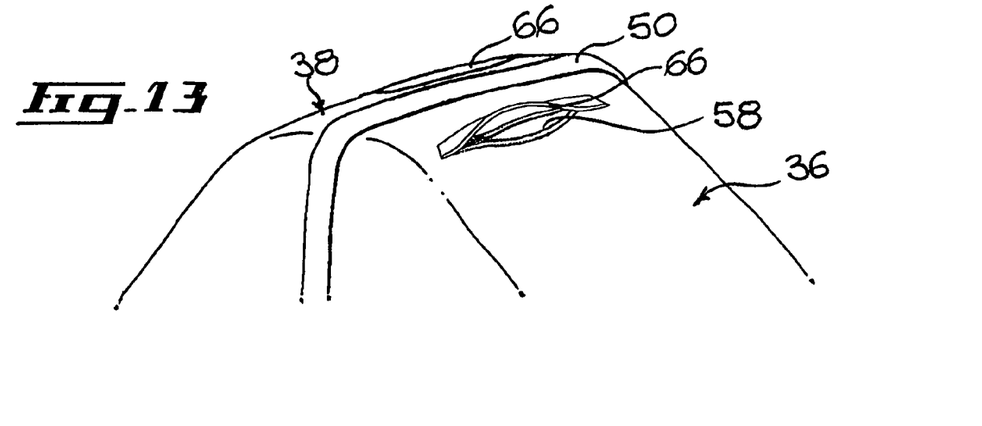
FIG. 13, in a partial perspective view with sections taken out, illustrates an auxiliary aperture, in accordance with an alternative embodiment of the present invention, the auxiliary aperture being shown in an opened configuration.
Figure 14:
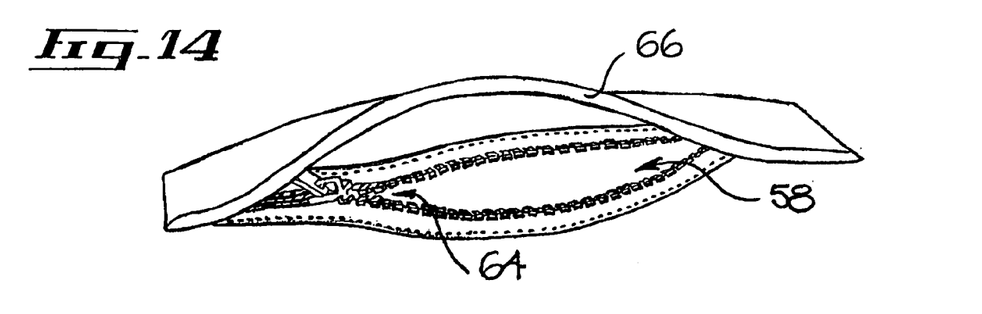
FIG. 14, in a close-up detailed view of FIG. 13, illustrates the auxiliary aperture in an opened configuration.

As illustrated in FIGS. 12 through 14, in an alternative embodiment of the invention, the handle cover apertures 58 may be provided with corresponding handle aperture zip-type fasteners 64. In such instances, the handle aperture zip-type fasteners 64 are preferably provided with corresponding zip-type fasteners flaps 66 for selectively covering the latter.

Figure 7:
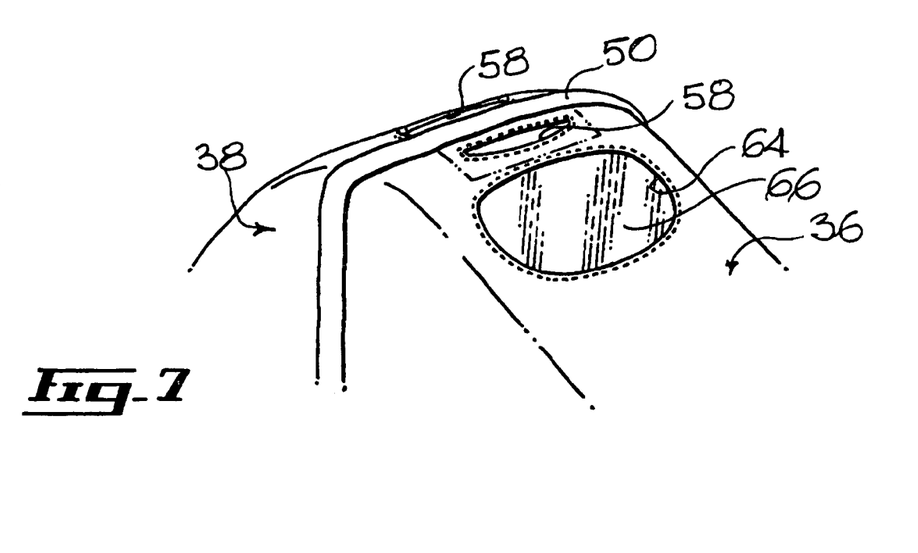
FIG. 7, in a partial perspective view with sections taken out, illustrates part an infant car seat cover in accordance with an alternative embodiment of the present invention.
Figure 8:
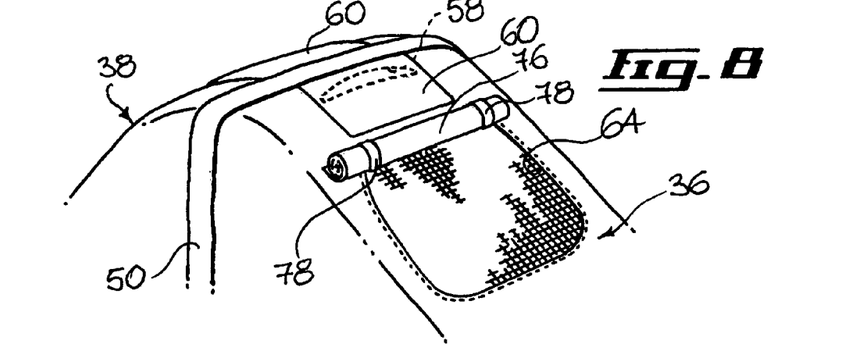
FIG. 8, in a partial perspective view with sections taken out, illustrates part of an infant car seat cover in accordance with yet another alternative embodiment of the present invention.
Figures 9, 10, 11:
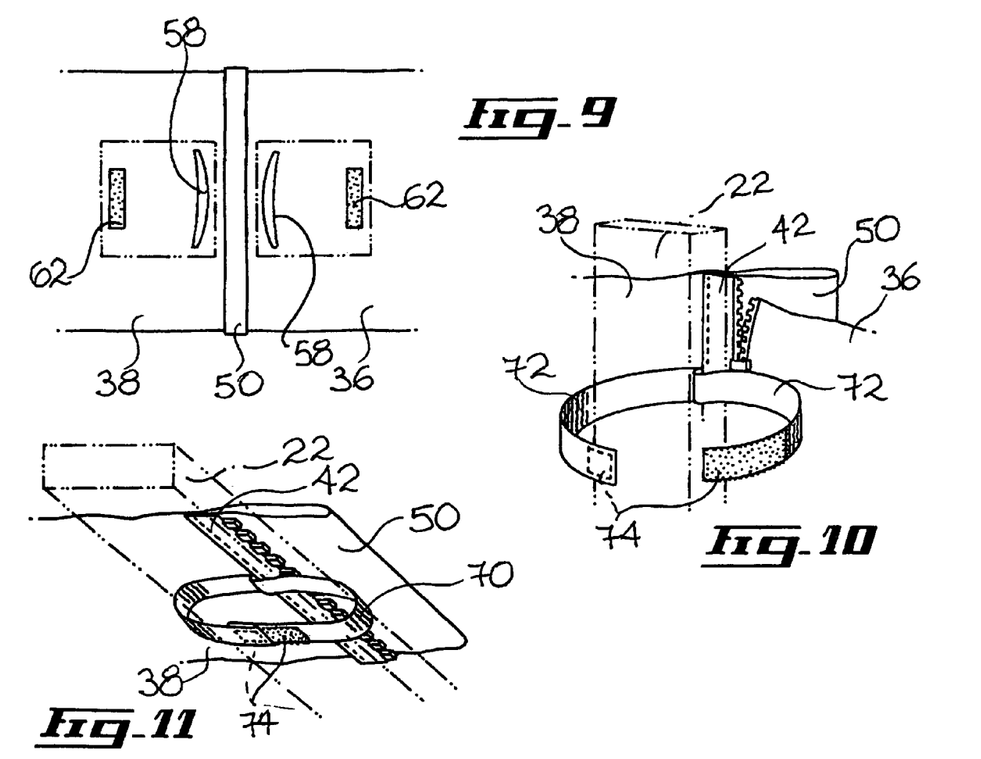
FIG. 9, in a partial top view with sections taken out, illustrates part of the infant car seat cover shown in FIGS. 1 through 6 with its auxiliary flaps removed.
FIG. 10, in a partial perspective view with sections taken out, illustrates a side attachment strap, part of an infant car seat cover, in accordance with an embodiment of the present invention.
FIG. 11, in a bottom perspective view with sections taken out, illustrates a top attachment strap, part of an infant car seat cover, in accordance with an embodiment of the present invention.

As illustrated in FIGS. 7 and 8, the strip of cover material is typically further provided with a cover main aperture 64 extending through the front section 36 and/or the rear section 38. The cover main apertures 64 are adapted to act as visual accessing means for facilitating visual access to the child when the cover 10 is in its fully covering configuration. The cover main apertures 64 are hence strategically positioned so as to be substantially in register with the head 54 of the infant when the cover 10 is in its fully covering configuration.

The cover main apertures 64 are typically provided with a substantially transparent or translucent material extending thereacross. For example, in FIG. 7, the cover main aperture 64 is provided with a strip of substantially transparent or translucent polymeric material extending thereacross. Optionally, the transparent or translucent could be tinted or otherwise treated.

FIG. 8, illustrates a preferred embodiment of the invention wherein the cover main aperture 64 is provided with a meshed screen 68 extending thereacross. The mesh-like material depicted in the embodiment shown in FIG. 8 is preferred since it allows air to flow therethrough and, hence, facilitates ventilation of the space occupied by the child when the cover is in its fully covering configuration. The mesh-like material depicted in the embodiment shown in FIG. 8 could be constructed of any lightweight mesh, netting or other suitable material allowing for adequate air flow and visibility of the seated infant therethrough.

The strip of cover material is still preferably further provided with a main aperture covering means for selectively covering and/or closing the cover main apertures 64. In the embodiment shown in FIG. 7, the main aperture covering means includes a main aperture curtain or flap 76 configured, sized and positioned so as to be selectively positionable over a corresponding cover main aperture 64.

The main aperture flap 76 is configurable between a flap deployed configuration (not shown) wherein the main aperture flap 76 extends over a corresponding cover main aperture 64 and a flap retracted configuration shown in FIG. 8 wherein the main aperture flap 76 is retracted from the corresponding cover main aperture 64. Typically, in the flap retracted configuration, the main aperture flap 76 is rolled away from the corresponding cover main aperture 64. Alternatively, the main aperture flap 76 may be folded or otherwise at least partially retracted from the corresponding cover main aperture 64.

Typically, the cover 10 is further provided with flap attachment means for releasably attaching or maintaining the main aperture flap 76 in the flap retracted configuration. For example, the cover 10 may be provided with flap retaining straps 78 extending therefrom for releasably retaining the main aperture flap 76 in the rolled configuration shown in FIG. 8. It should be understood that other types of flap attachment means could be used without departing from the scope of the present invention.

As illustrated more specifically in FIGS. 3, 5, 10, and 11, the cover 10 is preferably yet still further provided with a cover-to-handle releasable attachment means for releasably securing the strip of cover material to the seat arm or handle 22. The cover-to-handle releasable attachment means typically includes at least one attachment strap 70 secured to the inner surface of the strip of cover material.

As illustrated more specifically in FIGS. 3 and 1, the attachment strap 70 is typically secured by corresponding sewing lines or other suitable means to the cover rear section 38 adjacent its peripheral edge. Preferably, the attachment strap is sandwiched intermediate the flange of the corresponding fastener strip 42 and the fabric of the strip of cover material so as to facilitate operation of the zip-type fastener 40.

The attachment strap 70 typically includes two strap sections configured and sized for encircling the seat arm or handle 22 and is provided with strap attachment means for releasably attaching the attachment strap 70 around the seat handle 70. The strap attachment means may take any suitable form such as complementary strap strips 74 of miniature hook and loop fibre commonly sold under the trade mark VELCRO. Again, snap, hook and eye, button or other types of closures could be used without departing from the scope of the present invention.

The attachment strap 70 is configured, sized and positioned so as to encircle the seat handle 22 substantially adjacent a center portion thereof. With some car seat models (not shown), the center portion of the seat handle is provided with a handle perpendicular segment extending substantially perpendicularly relative to the remainder of the seat handle that is substantially longitudinally relative to the infant car seat 12. The attachment strap 70 is configured, sized and positioned so as to encircle the center portion of such seat handles as well.

The cover-to-handle releasable attachment means typically also includes auxiliary attachment straps 72 secured to the inner surface of the strip of cover material. As illustrated in FIG. 5, an auxiliary attachment strap 72 is typically positioned on the central segment of the seat handle 22 on each side of the attachment strap 70. These auxiliary attachment straps 72 may further be used to suspend decorative, functional or entertaining objects or toys such as baby shakers, pacifiers or the like designated by the reference letter T in FIG. 5.

Optionally, other auxiliary attachment straps 72 may be positioned on each side of the strip of cover material adjacent the cover base peripheral edge 32 for attachment to the lateral segments of the seat handle 22. As illustrated more specifically in FIG. 10, similarly to the attachment strap 70, the auxiliary attachment straps 72 are also preferably sandwiched intermediate the flange of the corresponding fastener strip 42 and strip of cover material so as to facilitate operation of the zip-type fastener 40.

As illustrated more specifically in FIGS. 1, 2 and 5, the cover 10 is typically still further provided with an exterior pocket 80 typically located on the front section 36. The pocket 80 is adapted to conveniently receive articles or items such as pacifiers, small toys or the like. Furthermore, the pocket 80 is optionally provided with an indicia 82 sewn or otherwise marked thereon for branding or other purpose. It should be understood that other pockets positioned at other locations and/or having a different configuration and/or size then that illustrated in the drawings could be used without departing from the scope of the present invention.

Typically, although by no means exclusively, the strip of cover material is made out of 10-oz. polar fleece 100% acrylic or 100% polyester, a waterproof yet breathable fabric provided with a fleece inner lining, flannel or any other suitable material. Optionally, the inner surface of the fabric is provided with a visually pleasing and/or soothing design in order to provide a pleasant visual environment to the infant when the cover is in its fully covering configuration.

Typically, although by no means exclusively, the section zip-type fastener is a 36-inches long zip-type fastener having a double slider or cursor, the cursor sliding in opposite directions relative to each other. Typically, although by no means exclusively, the strips of miniature hook and loop fibre are ¾in. in width while the elastic band is also typically ¾in. in width.

While the description above indicates the preferred materials and attachment methods used in the construction of the invention, those skilled in the art will appreciate that many suitable materials and attachment method could be used in the construction of the invention. For example, the various pieces of the cover 10 could be attached adhesively by rivets or any other suitable means rather than by sewing without departing from the scope of the present invention.

The invention claimed is:

1. An infant car seat cover for mounting over an infant car seat, said infant car seat including a seat front section for supporting the legs of an infant and a seat back section for supporting the head and torso of said infant, said infant car seat also including opposite seat side sections extending from the edges of said seat front and back sections; said seat front, back and side sections together defining a seat peripheral edge; said infant car seat also including a substantially U-shaped seat handle pivotally attached to said seat side sections for pivotal movement between an extended configuration a retracted configuration for respectively facilitating handling of said infant car seat and facilitating insertion and withdrawal of said infant into and out of said infant car seat; said infant car seat cover comprising:

a strip of cover material, said strip of cover material defining a cover base peripheral edge, said cover base peripheral edge being configured and sized so as to be wrappable about said seat peripheral edge; said cover base peripheral edge being provided with a cover releasable attachment means for releasably attaching said strip of cover material to said seat; said strip of cover material having a substantially tent-like configuration such that with said cover base peripheral edge wrapped around said seat peripheral edge, said strip of cover material is configured and sized so as to fit over said infant car seat with its arm in its extended configuration; said strip of cover material defining a cover front section and a generally opposed cover rear section for substantially covering respectively said seat front and back sections; said cover front and rear sections being releasably attached together about adjacent peripheral edges thereof by a suitable section releasable attachment means, said strip of cover material being further provided with at least one cover handle aperture extending therethrough; said cover handle aperture being configured, positioned and sized so as to allow an intended user to grasp said seat handle when said strip of cover material is mounted over the latter in its extended configuration; and a handle aperture covering means positionable for selectively covering said cover handle aperture, said handle aperture covering means including a handle aperture flap configured, sized and positioned so as to be positionable over said cover handle aperture;

a flap releasable attachment means for releasably attaching said flap to said strip of cover material in an overlying relationship relative to said cover apertures.

2. An infant car seat cover as recited in claim 1 wherein, when in a closed configuration, said strip of cover material defines a pair of substantially opposed and generally triangular side surfaces joined about corresponding edges by a pair of a substantially rectangular-shaped and angled top surfaces; said top surfaces merging about the apex of said strip of cover material.

3. An infant car seat as recited in claim 1 wherein said cover front and rear sections are configured and sized such that when detached from each other about said section releasable fastening means, said strip of cover material may be positioned in a so called blanket configuration wherein said cover rear section is adapted to be attached to said seat arm in its extended configuration so as to form a hood for the head of an infant while said cover front section is laid down over the body of said infant so as to act as a blanket for the latter.

4. An infant car seat as recited in claim 1 wherein said cover releasable attachment means includes a strip of resiliently deformable material protectively housed within a corresponding strip hem.

5. An infant car seat as recited in claim 1 wherein said section releasable attachment means includes a zip-type fastener.

6. An infant car seat as recited in claim 1, wherein said strip of cover material is provided with a cover handle aperture extending through both said cover front and rear sections substantially adjacent their respective peripheral edges; said cover handle apertures being both configured, positioned and sized so as to allow an intended user to grasp said seat handle when said strip of cover material is mounted over the latter in its extended configuration.

7. An infant car seat as recited in claim 1 wherein said handle cover aperture is provided with corresponding handle aperture zip-type fasteners.

8. An infant car seat cover as recited in claim 1 wherein said strip of cover material is further provided with a cover main aperture extending therethrough for allowing visual access to said child.

9. An infant car seat as recited in claim 8 wherein said cover main aperture is provided with a strip of substantially transparent or translucent material extending thereacross.

10. An infant car seat as recited in claim 8 wherein said cover main aperture is provided with a meshed screen extending thereacross.

11. An infant car seat as recited in claim 8 further comprising a main aperture covering means for selectively covering said cover main apertures.

12. An infant car seat as recited in claim 1 further comprising a cover-to-handle releasable attachment means for releasably securing said strip of cover material to said seat handle.

13. An infant car seat as recited in claim 12 wherein said cover-to-handle releasable attachment means includes at least one attachment strap secured to said inner surface of said strip of cover material.

14. An infant car seat as recited in claim 13 wherein said attachment strap includes two strap sections configured and sized for encircling said seat handle, said attachment strap also including strap attachment means for releasably attaching said attachment strap around said seat handle.

15. An infant car seat as recited in claim 14 wherein said attachment strap is configured, sized and positioned so as to encircle said seat handle substantially adjacent a center portion thereof.

16. An infant car seat as recited in claim 14 wherein said cover-to-handle releasable attachment means also includes auxiliary attachment straps secured to the inner surface of said strip of cover material; an auxiliary attachment strap being adapted to be positioned on a central segment of said seat handle on each side of said attachment strap.

17. An infant car seat as recited in claim 1 further comprising an exterior pocket.

* * * * *